(12) United States Patent
Giritzer

(10) Patent No.: US 7,753,422 B2
(45) Date of Patent: Jul. 13, 2010

(54) APPARATUS FOR SUSPENDING A LOG

(76) Inventor: Ludwig Giritzer, Soeldenlehen 11, D-83471 Berchtesgaden-Engedey (DE)

( * ) Notice: Subject to any disclaimer, the term of this patent is extended or adjusted under 35 U.S.C. 154(b) by 1041 days.

(21) Appl. No.: 11/481,558

(22) Filed: Jul. 6, 2006

(65) Prior Publication Data

US 2008/0007074 A1 Jan. 10, 2008

(51) Int. Cl.
*B66C 1/34* (2006.01)
*B66C 1/10* (2006.01)
*A01G 23/00* (2006.01)
*F16G 11/14* (2006.01)

(52) U.S. Cl. .................. 294/82.24; 294/82.14; 294/905

(58) Field of Classification Search .............. 294/82.24, 294/82.25, 82.14, 905, 82.3, 82.32, 82.36, 294/75, 110.1
See application file for complete search history.

(56) References Cited

U.S. PATENT DOCUMENTS

| 3,104,909 | A | 9/1963 | Walker |
| 3,134,154 | A | 5/1964 | Smith |
| 4,358,144 | A | 11/1982 | Schmidt et al. |
| 4,417,758 | A | 11/1983 | Vaders |
| 4,709,952 | A | 12/1987 | Selby |
| 6,654,990 | B2 * | 12/2003 | Liu .................. 294/82.24 |

FOREIGN PATENT DOCUMENTS

| AT | 389 291 B | 11/1989 |
| AT | 409 915 B | 12/2002 |
| EP | 1685761 | * 8/2006 |

* cited by examiner

*Primary Examiner*—Paul T Chin
(74) *Attorney, Agent, or Firm*—Flynn, Thiel, Boutell & Tanis, P.C.

(57) ABSTRACT

An apparatus for suspending a log comprises a cable having at one end a knob to be hitched into a hitching body. The hitching body which is provided for this purpose with a longitudinal opening is pivoted to a swivel head between a closed position in the swivel head and a release position swiveled out of the swivel head. The swivel head has a sliding eye through which the cable is slidingly guided. With a locking device the hitching body is locked in the closed position. For actuating the locking device, an actuator is provided which is driven with a remote control. The longitudinal opening of the hitching body has an enlargement at its end facing away from the swivel pin for hitching and unhitching the cable end with the knob in the closed position. Below the enlargement a support for the hitched knob is provided. The locking device has a locking bolt which engages a notch in the hitching body. The locking bolt is spring-loaded in the unlocking position and adapted to be stopped in the locking position by a catch which the actuator attacks.

10 Claims, 2 Drawing Sheets

APPARATUS FOR SUSPENDING A LOG

Figure 1:
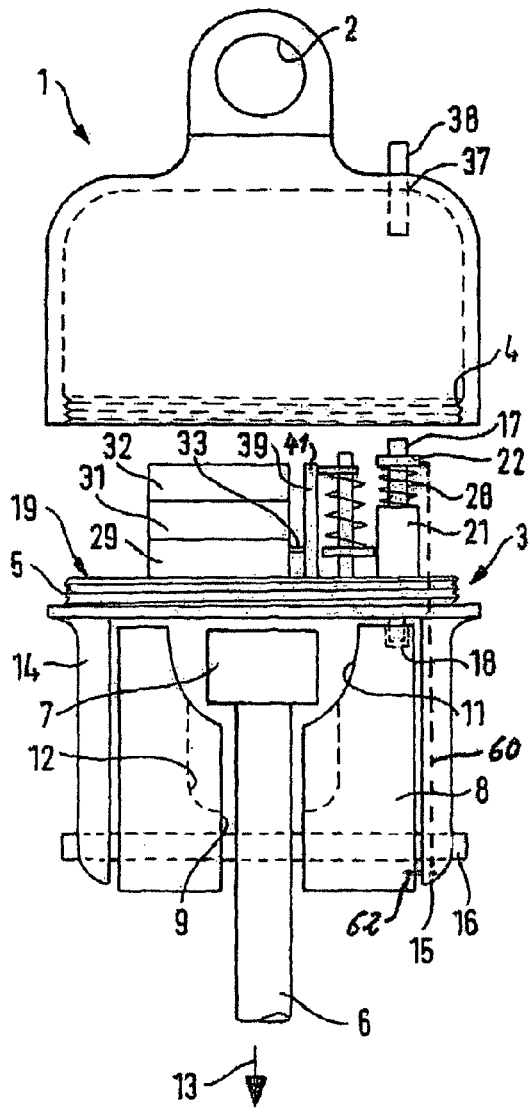

This invention relates to an apparatus for suspending a log or similar elongate object according to the preamble of claim 1.

Such an apparatus is also referred to as a choker or choker slider. A choker slider is used in particular for transporting logs with a cableway crane from a hill to the valley. The main cable stretched between hill and valley forms the track for a carriage which is displaced by an operating cable. Fastened to the carriage is e.g. a 2 meter long cable which is passed through the sliding eye on the hitching body of the choker and then wrapped around the log. Fastening the cable end to the hitching body forms a loop which tightens around the log when it is hanging on the carriage. For fastening the cable end to the hitching body, the cable end has a knob made e.g. of steel. The hitching body is provided with a longitudinal opening having an enlargement at the upper end. The knob is inserted into the hitching body from outside through the enlargement, and the cable portion adjacent to the knob through the longitudinal opening.

The cable is then drawn downward, thereby causing the knob to rest on a shoulder or the like inside the hitching body below the enlargement at the height of the narrow longitudinal opening, so that it can no longer slip out laterally when a downward pull is exerted on the cable. The log is thus safely fixed for transport with the cableway crane into the valley.

There it is unloaded onto a log pile. To open the loop, a person must climb onto the pile and pull the knob at the cable end out of the hitching body. This activity is strenuous, time-consuming and dangerous.

To make this activity unnecessary, a choker slider is known in which the cable end with the knob is fixed between a pair of jaws movable in scissor-like fashion and adapted to be opened by a remote control when the log is unloaded in the valley (U.S. Pat. No. 4,709,952).

Since the reach of the remote control is limited, the known remotely controlled choker slider has the disadvantage that when the jaws have been closed on the hill they can only be opened again elaborately with special tools, e.g. if the log has been improperly suspended. That is, the cable end with the knob cannot be simply pulled out of the hitching body again as is the case in the conventional choker slider described at the outset.

AT-B-409 915 discloses an apparatus according to the preamble of claim 1. The hitching body is locked using a catch lever which is spring-loaded in the locking position. Releasing the catch lever requires a considerable force and thus an accordingly large dimensioned actuator. The hitching body is formed as a claw which must be swiveled into the release position to permit the cable end with the knob to be unhitched. To permit the loop to be opened on a hill, it is therefore likewise necessary to insert a tool, namely a mandrel, through a housing opening and urge it against the catch lever to swivel it into the unlocked position.

It is the problem of the invention to provide an apparatus having an actuator with small dimensions which permits the loop to be opened without tools even when no remote control is available.

This is achieved according to the invention by the apparatus characterized in claim 1. Advantageous embodiments of the inventive apparatus are stated in the sub-claims.

The inventive apparatus has a swivel head to which a hitching body is pivoted around a swivel pin between a closed position in the swivel head and a release position swiveled out of the swivel head. The hitching body is provided with a longitudinal opening for hitching a knob at one end of the traction means. In the release position swiveled out of the swivel head, the traction means end with the knob is released. The swivel head has a sliding eye through which the traction means is slidingly guided to form a loop tightening around the hanging log. To lock the hitching body in the closed position, a locking apparatus is provided. To unlock the hitching body and thus swivel it into the release position, the locking device is actuated with an actuator which is driven by a remote control.

The longitudinal opening of the hitching body has an enlargement at its end facing away from the swivel pin. Further, a support for the hitched knob is provided below the enlargement. Thus, the traction means end with the knob can also be hitched as well as unhitched in the closed position of the hitching body to open the loop. It is thus possible to open the loop manually with no problem even without remote control, e.g. at the top of a hill.

However, when the log has been transported into the valley with the cableway crane to be unloaded on the log pile, the inventive choker slider can be opened by remote control, so that there is no strenuous, time-consuming and dangerous manual opening of the loop on the log pile.

The remote control is preferably effected by radio. However, any other remote control is also possible, for example an infrared remote control.

The inventive apparatus is intended primarily for a cableway crane. It is obvious, however, that it can also be used with other transport means by which logs are transported in hanging fashion. Also, the inventive apparatus is intended primarily for logs, but can also be used for other log-shaped material, such as beams or masts, also made of materials other than wood. Also, the logs do not need to be transported freely suspended; they can also be affixed.

According to the invention, the eye through which the cable is slidingly guided is firmly connected to the swivel head, preferably integrally, for example welded thereto. However, it is also possible to connect the sliding eye to the swivel head in another way.

The swivel head preferably comprises two parts which are detachably inter-connectable, the hitching body being linked to the one, lower swivel head portion, while the sliding eye can be fastened to the other, upper swivel head portion. Preferably, the two swivel head portions form a housing which receives the locking device and all components for actuating the locking device, i.e. in particular the remote control receiver, the actuator for actuating the locking device, and the energy supply for the receiver and the actuator. The actuator can be e.g. an electromagnet. However, it is preferably formed by an electromotor.

The locking device and the components for actuating the same are for this purpose preferably disposed on a mounting plate on the lower swivel head portion with the hitching body. For pivoting the hitching body, the lower swivel head portion is preferably formed as a fork.

The other, upper swivel head portion is formed as a hood or bell adapted to be put over the mounting plate and thus covers the locking device and the components for actuating the same. For connecting the two swivel head portions the latter are preferably adapted to be screwed together, the mounting plate e.g. having an external thread on the circumference and the hood or bell having provided therein a mating internal thread. Instead of a screw lock, any other lock, in particular turning lock, is also possible for connecting the two swivel head portions.

The traction means employed for suspending the log or the like is preferably a cable. However, it can also be a band, chain or the like. The inventive apparatus is thus suitable in particular for round slings.

The locking device of the inventive apparatus has a locking bolt which engages a notch at the end of the hitching body facing away from the swivel pin. The locking bolt is spring-loaded into the unlocking position and stopped in the locking position by a catch which the actuator attacks. The locking bolt is guided displaceably in a guide which is preferably disposed on the lower swivel head portion, preferably on the mounting plate.

Figure 2:
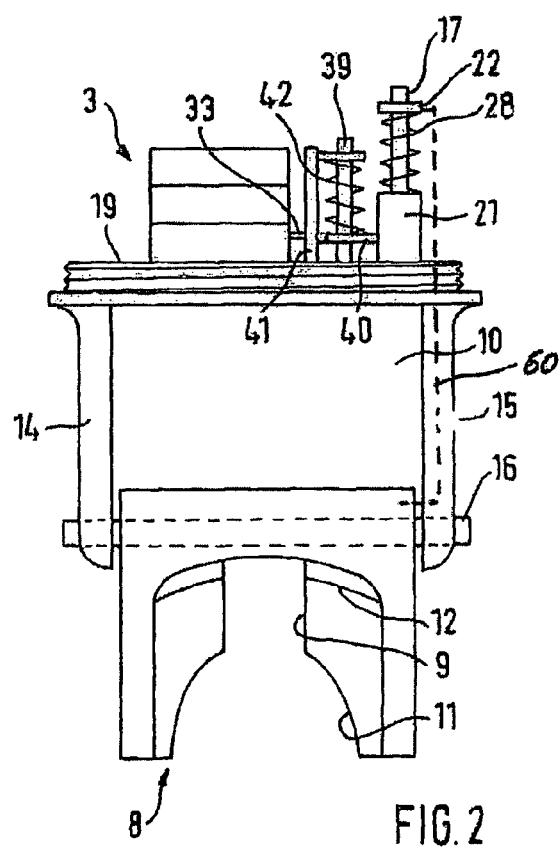
Figure 3:
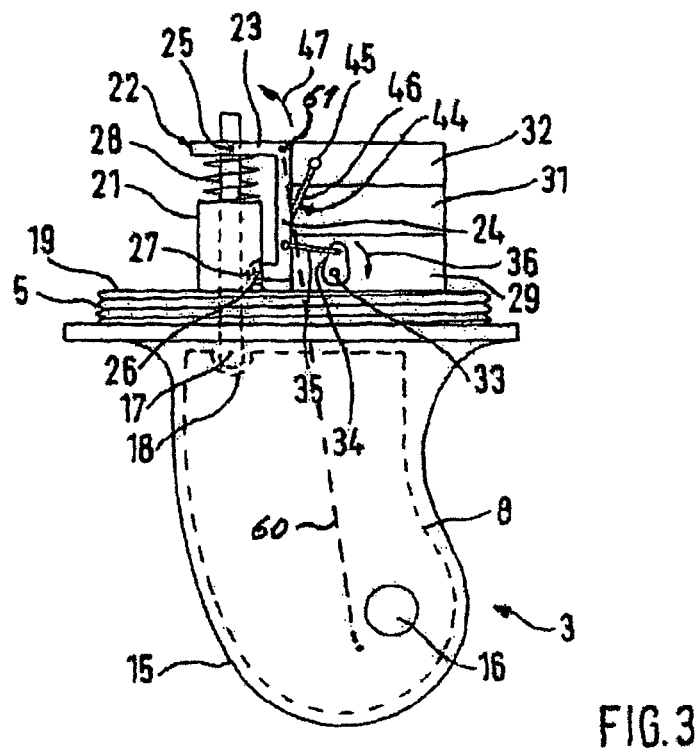
Figure 4:
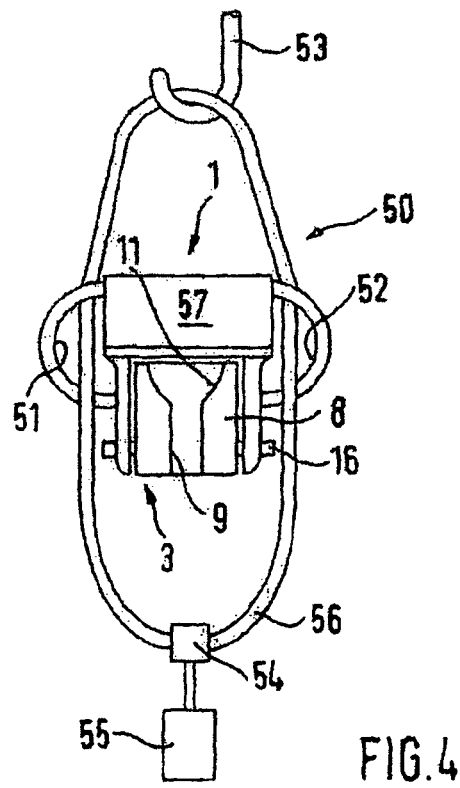

An embodiment of the inventive apparatus will hereinafter be explained more precisely by way of example with reference to the drawing. The figures show schematically:

FIG. 1 a perspective view of the apparatus from the front with the hitching body in the closed position, the upper swivel head portion with the sliding eye being unscrewed from the lower swivel head portion;

FIG. 2 a view corresponding to FIG. 1 of the lower swivel head portion, but with the hitching body swiveled downward into the release position;

FIG. 3 a side view of the lower swivel head portion with the hitching body in the closed position; and FIG. 4 a view of the apparatus with a round sling as the traction means.

Accordingly, the apparatus comprises an upper swivel head portion 1 with a sliding eye 2 and a lower swivel head portion 3. The upper swivel head portion 1 has an internal thread 4 shown by dashed lines to be screwed onto an external thread 5 on the lower swivel head portion 3.

A log (not shown) is suspended using a steel cable having a knob 7,. e.g. a steel sleeve, provided on its end 6 shown in FIG. 1.

The cable 6 is guided through the sliding eye 2 and fastened to the carriage (not shown) of a cableway crane. The cable end 6 with the knob 7 guided through the sliding eye 2 by the carriage is placed around the log to be transported (not shown) to form a loop which tightens around the log when the latter is suspended.

For this purpose, the cable 6 according to FIG. 1 with the knob 7 is hitched into a sleeve-shaped hitching body 8 when the latter is located in the closed position shown in FIG. 1. The hitching body 8 has on its front side a longitudinal opening 9 which is provided with an enlargement 11 at the upper end. As shown in FIG. 1, the knob 7 and the adjacent cable portion 6 can thus be slid through the enlargement 11 and the longitudinal opening 9 into the sleeve-shaped hitching body 8 from the outside to the inside and from the inside to the outside.

The sleeve-shaped hitching body 8 is provided on the inside below the enlargement 11 with an inside shoulder 12 which forms a support when the cable portion 6 with the knob 7 slid into the hitching body 8 is drawn downward according to the arrow 13. Thus, the knob 7 is fixed safely behind the longitudinal opening 9 when the log hangs in the cable loop.

The hitching body 8 is pivoted to the lower swivel head portion 3 between the closed position shown in FIGS. 1 and 3 and the release position shown in FIG. 2. The lower swivel head portion 3 is formed for this purpose as a fork. Extending through the two faces 14, 15 of the fork and through the hitching body 8 is a swivel pin 16 at the lower end. The two faces 14, 15 are interconnected at the back by a bar 10 or the like.

The hitching body 8 is lockable in the closed position shown in FIGS. 1 and 3 by a locking device which is operable with a remote control.

Provided for locking is a locking bolt 17 which engages from above a notch 18 shown by dashed lines in FIGS. 1 and 3 on the side of the hitching body 8 facing away from the swivel pin 16. The locking bolt 17 penetrates for this purpose a mounting plate 19 which is formed in a disk shape and provided on its outer circumferential wall with the external thread 5.

The locking bolt 17 is guided in a guide formed as a sleeve 21 which is disposed on the mounting plate 19. The locking bolt 17 is spring-loaded into its unlocking position and adapted to be stopped by a catch 22 in its locking position according to FIGS. 1 and 3. The catch 22 is formed angularly from two legs 23 and 24.

The leg 23 is pivoted around a cross pin 25 to the upper end of the locking bolt 17 protruding from the sleeve-shaped guide 21.

For stopping the locking bolt 17 in the locking position according to FIGS. 1 and 3, the catch 22 has on the other leg 24 a finger 26 which engages a notch 27 in the sleeve-shaped guide 21.

The finger 26 is spring-loaded into the notch 27 in the engaged position. For spring-loading the locking bolt 17 into the unlocking position and at the same time for spring-loading the finger 26 into the engaged position into the notch 27, a compression spring 28 is used which is supported on the leg 23 of the catch 22, on the one hand, and on the sleeve 21, on the other hand.

The mounting plate 19 and the upper swivel head portion 1 formed as a bell adapted to be screwed thereto form a housing which receives all parts required for actuating the locking device.

That is, the mounting plate 19 has an electromotor 29 disposed thereon, further the receiver 32 of the remote control and a battery 31 for supplying power to the electromotor 29 and to the receiver 32.

The electromotor 29 has a reduction gear (not shown) having fastened to its output shaft 33 shown in FIG. 3 an eccentric 34 which is pivoted to the leg 24 of the catch 22 via a coupling rod 35.

The electromotor 29 is activated by the receiver 32 of the remote control.

Rotation of the output shaft 33 in the direction of the arrow 36 thus pulls the catch 22 out of the notch 27, thereby pulling the locking bolt 17 by the force of the compression spring 28 out of the notch 18 in the hitching body 8, so that the hitching body 8 is swiveled into the release position shown in FIG. 2 and thus the cable end 6 with the knob 7 hitched in the hitching body 8 is released.

For engaging the notch 18 in the hitching body 8, the locking bolt 17 is urged downward manually, thereby causing the hitching body 8 to resume its closed position to permit a log to be suspended with the apparatus again.

For this purpose, a bolt 38 is guided displaceably in a recess 37 in the upper swivel head portion 1 according to FIG. 1, said bolt attacking the upper end of the locking bolt 17 to urge it downward into the notch 18.

The sleeve-shaped guide 21 with the locking bolt 17 is guided displaceably in the longitudinal direction of the locking bolt 17 and spring-loaded into the locking position of the locking bolt 17. For this purpose, a bolt 39 for guiding the sleeve 21 is fastened to the mounting plate 19 according to FIGS. 1 and 2. The sleeve 21 has for this purpose a bracket 40 which is penetrated by the guide rod 39. A compression spring 42 is supported on the bracket 40, on the one hand, and on the upper end of a holder 41 fastened to the mounting plate 19, on the other hand. This slidable guidance of the sleeve 21 with the locking bolt 17 permits the hitching body 8 to be swiveled into its closed position according to FIGS. 1 and 2 even if the locking bolt 17 has inadvertently been urged by actuation of the bolt 38 into its lower position where it is stopped by the catch 22.

To spare the battery 31, a switch 44 is provided according to FIG. 3 for switching off the receiver 32 when the locking bolt 17 has been unlocked, i.e. the carriage is being transported from the valley to the hill. The switch 44 is formed by a lever 46 pivoted around a pin 45 and actuated by the catch 22 for switching off the switch when said catch is swiveled with the eccentric 34 and the coupling rod 35 according to the arrow 47, so that the finger 26 is pulled out of the notch 27 and thus the locking bolt 17 out of the notch 18.

In the apparatus according to FIG. 4, the traction means used is not a cable but a round sling 50, i.e. an endless band.

For this purpose, a sliding eye 51, 52 through which the round sling 50 is guided is fastened on each side to the upper swivel head portion 1 or the lower swivel head portion 3. Hitched to the upper end of the round sling 50 is the hook 53 of a crane for example. Fastened to the lower end 56 with a clevis 54 is a knob 55. The knob 55 is hitched into the hitching body 8 in the same way as the knob 7 according to FIG. 1.

The round sling 50, consisting of textile material for example, is used primarily where a steel cable could lead to damage because it cuts in, for example with beams, glued laminated timber or the like, e.g. in carpenter's work or in timber building, or e.g. where a steel cable could slip, e.g. with an iron girder.

The eyes 51, 52 are formed according to FIG. 4 by two bows which are fastened to a ring 57 which is fastened to the upper swivel head portion 1, for example with a bolt (not shown) inserted through the eye 2 according to FIG. 1 on the upper swivel head portion 1.

Manually compressing the spring 28 with the bolt 38 requires a relatively large force.

As shown by dashed lines in FIGS. 1 to 3, a rod 60 (shown by dashed lines) can therefore be provided, instead of the bolt 38, for engaging the locking bolt 17 into the notch 18. The rod 60 can be linked to the locking bolt 17 directly. However, it is preferably linked to the locking bolt 17 indirectly. For this purpose, it is linked at 61 to the catch 22 between the legs 23 and 24, on the one hand, and eccentrically at 62 to the hitching body 8, on the other hand. Thus the locking bolt 17 is slid into the notch 18 when the hitching body 8 is swiveled from the downward swiveled release position according to FIG. 2 into the closed position according to FIGS. 1 and 3. As shown in FIGS. 1 and 3, the rod 60 preferably extends so as to be protected in the one face 15 of the lower fork-shaped swivel head portion 3. In FIG. 3 the lower swivel head portion 3 is shown curved. However, the lower swivel head portion can also be of cylindrical form.

The invention claimed is:

1. In an apparatus for suspending a log or similar elongate object having a traction means, for use on a cableway crane, and having a swivel head on which is supported a hitching body having a longitudinal opening for hitching a knob at one end of the traction means, wherein the hitching body is pivoted around a swivel pin between a closed position in the swivel head and a release position swiveled out of the swivel head and wherein, for the traction means end with the knob through which the traction means is slidingly guided so as to form a loop for tightening around a log or similar elongate object which thereby hangs downwardly from the apparatus, the swivel head further having a locking device for locking the hitching body in the closed position, and having a remote control for an actuator for actuating the locking device, comprising the improvement wherein the longitudinal opening of the hitching body has an enlargement at an outer end facing away from the swivel pin for hitching and unhitching the traction means end with the knob when the swivel head is in the closed position, and a support is provided below the enlargement for engaging the hitched knob when being pulled downwardly, the locking device having a locking bolt which engages a notch at the outer end of the hitching body facing away from the swivel pin, and the locking bolt being spring-loaded into the unlocking position and adapted to be stopped in the locking position by a catch which is operated by the actuator.

2. The apparatus according to claim 1, wherein the swivel head comprises at least two interconnectable swivel head portions, the hitching body being linked to the one swivel head portion, and the sliding eye being fastened to the other swivel head portion.

3. The apparatus according to claim 1, wherein the catch is linked at a first end to the locking bolt and engages at a second end a notch when the locking bolt is in the locking position.

4. The apparatus according to claim 3, wherein the catch is spring-loaded into the notch in the engaged position.

5. The apparatus according to claim 3, wherein for spring-loading the locking bolt and for spring-loading the catch, a compression spring is provided which is supported on the first end of the catch linked to the locking bolt, on the one hand, and is supported on a guide for the locking bolt, on the other hand.

6. The apparatus according to claim 1, wherein the actuator is formed to draw the catch out of the notch.

7. The apparatus according to claim 1, wherein a manual actuation is provided for engagement of the locking bolt into the notch in the hitching body.

8. The apparatus according to claim 7, wherein for engagement of the locking bolt into the notch in the hitching body, a rod is provided which is linked at one end to the locking bolt or the catch and at the other end eccentrically to the hitching body.

9. The apparatus according to claim 8, wherein the locking bolt is guided displaceably in a guide, and the guide is in turn guided displaceably in the longitudinal direction of the locking bolt and spring-loaded in the locking position of the locking bolt.

10. The apparatus according to claim 1, wherein a switch is provided which switches off a receiver of the remote control when the locking bolt is unlocked.

* * * * *